(12) United States Patent
Fitts, Jr. et al.

(10) Patent No.: US 7,384,491 B2
(45) Date of Patent: Jun. 10, 2008

(54) APPARATUS AND METHODS FOR MAKING CROSSLINKED ELASTIC LAMINATES

(75) Inventors: James R. Fitts, Jr., Gainesville, GA (US); Christopher A. Laslie, Cumming, GA (US); Oomman P. Thomas, Alpharetta, GA (US); Howard M. Welch, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/218,313

(22) Filed: Sep. 1, 2005

(65) Prior Publication Data
US 2007/0044905 A1 Mar. 1, 2007

(51) Int. Cl.
| | |
|---|---|
| B29C 70/52 | (2006.01) |
| B29C 47/36 | (2006.01) |
| B65H 81/00 | (2006.01) |
| B32B 27/02 | (2006.01) |
| D04H 3/16 | (2006.01) |
| B29C 65/02 | (2006.01) |
| B29C 65/72 | (2006.01) |

(52) U.S. Cl. ............ 156/169; 156/166; 156/192; 156/242; 156/244.11; 156/307.1; 198/377.04; 252/182.11

(58) Field of Classification Search ............ 198/377.04; 252/182.11–182.35; 156/166–181, 191, 156/192, 242, 243, 244.11, 272.2, 307.1; 425/381.2

See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,837,771 A * | 9/1974 | Kolakowski et al. | 425/110 |
| 3,849,241 A | 11/1974 | Butin et al. | |
| 4,340,563 A | 7/1982 | Appel et al. | |

(Continued)

FOREIGN PATENT DOCUMENTS

| | | |
|---|---|---|
| EP | 0 733 472 A2 | 9/1996 |
| EP | 1331090 | 1/2003 |
| EP | 1 246 881 B1 | 4/2004 |

Primary Examiner—Philip C. Tucker
Assistant Examiner—Sonya Mazumdar
(74) Attorney, Agent, or Firm—Dority & Manning, P.A.

(57) ABSTRACT

An apparatus for making an elastic laminate including a crosslinked elastic layer formed of an elastic copolymer includes a die for extruding a layer of crosslinkable elastic copolymer, at least one roll for conveying the elastic layer, a supply source for providing at least one nonwoven web, a lamination nip for laminating at least one nonwoven web to the elastic layer, a processing unit for crosslinking the elastic layer and a winder for collecting the elastic laminate. The crosslinkable elastic copolymer may be a crosslinkable elastic styrenic block copolymer, a crosslinkable semi-crystalline polyolefin plastomer, or a crosslinkable propylene-ethylene copolymer. The crosslinkable elastic layer may be extruded in the form of a plurality of parallel filaments such as by a filament die. The processing unit may be positioned between the at least one roll and the lamination nip or may be positioned between the lamination nip and the winder. The processing unit may have an open or a closed configuration and may be an electron beam processing unit.

13 Claims, 8 Drawing Sheets

U.S. PATENT DOCUMENTS

| | | | |
|---|---|---|---|
| 4,418,123 A * | 11/1983 | Bunnelle et al. ............. 428/517 |
| 4,434,562 A * | 3/1984 | Bubley et al. ................. 34/278 |
| 4,652,487 A | 3/1987 | Morman |
| 4,655,760 A | 4/1987 | Morman et al. |
| 4,657,802 A | 4/1987 | Morman |
| 4,720,415 A | 1/1988 | Vander Wielen et al. |
| 4,781,966 A | 11/1988 | Taylor |
| 4,789,699 A | 12/1988 | Kieffer et al. |
| 4,965,122 A | 10/1990 | Morman |
| 4,981,747 A | 1/1991 | Morman |
| 5,011,733 A | 4/1991 | Hiraki et al. |
| 5,226,992 A | 7/1993 | Morman |
| 5,332,613 A | 7/1994 | Taylor et al. |
| 5,336,545 A | 8/1994 | Morman |
| 5,385,775 A | 1/1995 | Wright |
| 5,514,470 A | 5/1996 | Haffner et al. |
| 5,789,065 A | 8/1998 | Haffner et al. |
| 5,853,881 A | 12/1998 | Estey et al. |
| 6,001,460 A | 12/1999 | Morman et al. |
| 6,057,024 A | 5/2000 | Mleziva et al. |
| 6,099,685 A * | 8/2000 | Ito et al. ...................... 156/330 |
| 6,207,237 B1 * | 3/2001 | Haffner ...................... 427/394 |
| 6,242,504 B1 | 6/2001 | Meyer-Roscher et al. |
| 6,323,389 B1 | 11/2001 | Thomas et al. |
| 6,387,471 B1 | 5/2002 | Taylor et al. |
| 6,570,714 B2 | 5/2003 | Soane et al. |
| 6,767,852 B2 | 7/2004 | Friderich et al. |
| 6,777,082 B2 | 8/2004 | Patel et al. |
| 6,783,842 B2 | 8/2004 | Niepelt |
| 6,794,024 B1 | 9/2004 | Walton et al. |
| 6,808,789 B2 | 10/2004 | Pelkie et al. |
| 2002/0019616 A1 | 2/2002 | Thomas |
| 2002/0064653 A1 | 5/2002 | Ladika et al. |
| 2002/0147273 A1* | 10/2002 | Patel et al. ................... 525/93 |
| 2003/0124331 A1 | 7/2003 | Morell et al. |
| 2004/0005832 A1 | 1/2004 | Neculescu et al. |
| 2004/0123938 A1 | 7/2004 | Neculescu et al. |
| 2004/0197588 A1 | 10/2004 | Thomas et al. |
| 2005/0163960 A1 | 7/2005 | Lapin |
| 2006/0055089 A1 | 3/2006 | Zhang et al. |

* cited by examiner

APPARATUS AND METHODS FOR MAKING CROSSLINKED ELASTIC LAMINATES

BACKGROUND OF THE INVENTION

Various elastic composites have been formed by bonding an elastic polymer layer in the form of a film, foam, nonwoven web or parallel strands, to one or more nonwoven facing layers. A "stretch bonded laminate" ("SBL") is any laminate in which an elastic layer is bonded to one or more facing layers while the elastic layer is stretched. When the elastic layer is subsequently relaxed, gathers form in the facing layer(s). Stretch-bonded laminates are described, for instance, in U.S. Pat. No. 6,387,471 to Taylor et al., and U.S. Pat. No. 6,323,389 to Thomas et al., which are incorporated herein by reference. A "neck-bonded laminate" ("NBL") is any laminate where an elastic layer is bonded to one or two non-elastic facing layers while the elastic layer is relaxed and the facing layer(s) are extended or necked to reduce their dimensions in the direction orthogonal to the extension. Neck-bonded laminates have cross-directional stretch and recovery properties. Neck-bonded laminates are described, for instance, in U.S. Pat. No. 5,853,881 to Estey et al., U.S. Pat. No. 4,965,122 to Morman, and U.S. Pat. No. 6,001,460 to Morman et al., and U.S. Pat. No. 5,789,065 to Haffner et al., which are incorporated herein by reference. A "neck-stretch bonded laminate" ("NSBL") is any laminate where an elastic layer is bonded to one or two facing layers while the elastic layer is stretched, and the facing layer(s) are extended in the same direction to cause necking in the direction orthogonal to the extension. Thus, a NSBL has features common to both a SBL and a NBL.

A "vertical filament laminate" ("VFL") or a "vertical filament stretch bonded laminate ("VFSBL") is any laminate where an elastic layer of substantially parallel, non-intersecting elastic strands formed of an elastomeric material is bonded to one or two facing layers while the elastic strands are in a stretched state and the facing layers are not stretched. When the laminate is relaxed, the elastic strands retract and the laminate becomes somewhat puckered and corrugated. The VFL exhibits elastic stretch in the longitudinal direction of the elastic strands which is also the machine direction of the inelastic facing layer or layers. A "continuous filament stretch bonded laminate" ("CFSBL") is any laminate where an elastic layer formed of substantially parallel, non-intersecting elastic strands overlaid by at least one overlapping array of conventional meltblown fibers is bonded to one or two facing layers while the elastic layer is stretched in the machine direction. Both the parallel elastic strands and the conventional meltblown fibers are formed of an elastomeric material. When the CFSBL is allowed to retract to a relaxed state, some gathering forms in the facing layer or layers. The relaxed CFSBL can be stretched in the machined direction of the laminate. Continuous filament stretch bonded laminates are disclosed, for instance, in U.S. Pat. No. 5,385,775 to Wright.

Various thermoplastic elastomers are known for use in the elastic layer, including without limitation styrenic block copolymers. For instance, U.S. Pat. No. 6,323,389 to Thomas et al. discloses the use of block copolymers having the general formula A-B-A' or A-B, wherein A and A' are each a thermoplastic polymer end block which contains a styrenic moiety such as a poly(vinylarene) and B is an elastomeric polymer midblock such as a conjugated diene or a lower alkene polymer. The A and A' blocks may be formed of the same or different polymer segments. Tetrablock copolymers having the formula A-B-A-B are also disclosed, where A is a thermoplastic polymer block as described above, and each B is an isoprene segment hydrogenated substantially to a poly(ethylene-propylene) segment.

Elastic laminates are typically the most expensive component in personal care products such as diapers, diaper pants, adult incontinence garments, feminine hygiene products and the like. Important properties of elastic laminates include providing sufficient elastic tension at various degrees of elongation during use, and providing sufficient recovery upon stress relaxation (creep resistance).

There is a further need or desire for apparatus and methods for making elastic laminates which perform better at lower cost.

SUMMARY OF THE INVENTION

The present invention is directed to an apparatus for making an elastic laminate including a die for extruding a layer formed of a crosslinkable elastic copolymer such as an elastic styrenic block copolymer, at least one roll for conveying the extruded elastic layer, a supply source for providing at least one nonwoven web, a lamination nip for laminating the at least one nonwoven web to the elastic layer, a processing unit for crosslinking the elastic layer and a winder for collecting the elastic laminate. The crosslinkable elastic copolymer may be extruded in the form of a polymeric film, foam, nonwoven web, elastic ribbon or elastic strand layer. The extrusion die may be a filament die for extruding a plurality of parallel crosslinkable elastic filaments, a film die, a foam die, or a ribbon die for extruding a plurality of crosslinkable elastic ribbons. The processing unit may apply electron beam, ultraviolet (UV) or gamma radiation to the elastic layer to crosslink the elastic copolymer. Suitably, the processing unit may be an electron beam processing unit having an open or a closed configuration. The processing unit may be positioned between the roll and the lamination nip. Alternatively, the processing unit may be positioned after the lamination nip. The apparatus may further include a meltblown die disposed above a web former for applying a random array of elastomeric fibers which overlay the extruded elastic layer.

The present invention is also directed to a method of making an elastic laminate. The method includes the steps of extruding a crosslinkable elastic copolymer such as a styrenic block copolymer, adjusting the temperature of the extruded elastic layer, providing at least one nonwoven web, laminating the at least one nonwoven web to the elastic layer, and crosslinking the elastic layer. The elastic layer may be crosslinked prior to or after lamination to the at least one nonwoven web.

The crosslinking of the elastic copolymer improves its elastomeric performance. When the uncrosslinked elastic copolymer is a low performance elastomer, the crosslinking converts it to a high performance elastomer (or, at least, to a higher performance elastomer). When the uncrosslinked elastic copolymer is a high performance elastomer, the crosslinking converts it to a higher performance elastomer.

The present invention permits the use of relatively less expensive lower performance elastomers as starting materials. For ease of processing, the elastic layer is formed using conditions which do not significantly crosslink the polymer materials. After the elastic layer is formed, it is crosslinked to improve its elastic performance.

With the foregoing in mind, it is a feature and advantage of the invention to provide an apparatus and method for making a relatively higher performance elastic laminate, using relatively lower performance (and less expensive) elastic polymer material.

It is a further feature and advantage of the invention to provide an apparatus and method for making an elastic laminate that may be readily integrated into existing production equipment.

DEFINITIONS

Figure 1:
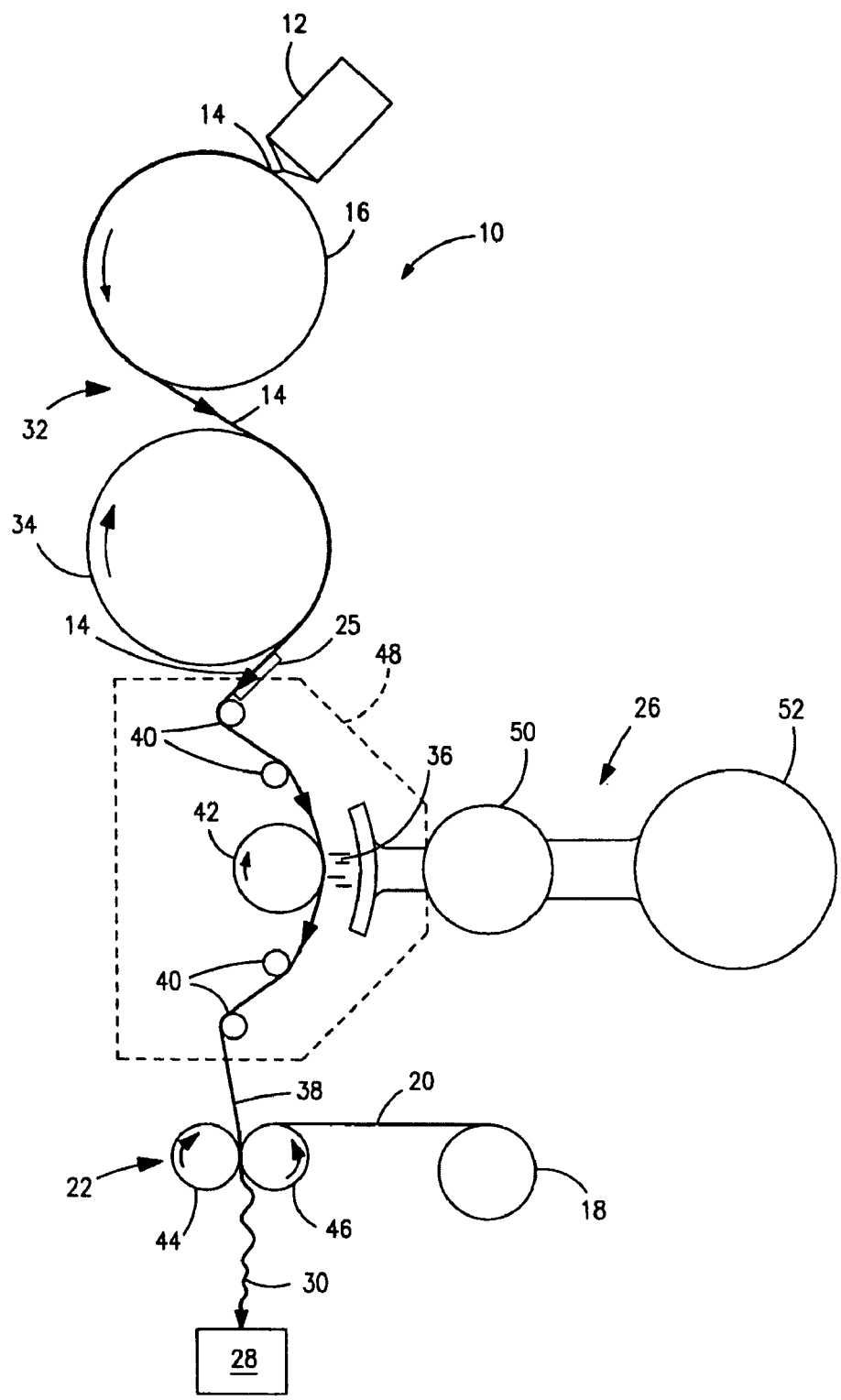
FIG. 1 illustrates an apparatus for making vertical filament laminates wherein a processing unit for crosslinking an elastic copolymer is disposed between a roll and a lamination nip.

"Elastic" and "elastomeric" refer to a fiber, film or fabric which upon application of a biasing force, is stretchable by at least 50% to a stretched, biased length which is at least 50% greater than, its relaxed, unstretched length, and which will recover at least 50 percent of its elongation upon release of the stretching, biasing force.

"Recover" refers to a relaxation of a stretched material upon removal of a biasing force following stretching of the material by application of the biasing force. For example, if a material having a relaxed, unbiased length of one (1) inch was elongated 50 percent by stretching to a length of one and one half (1.5) inches the material would have a stretched length that is 50% greater than its relaxed length. If this exemplary stretched material contracted, that is recovered to a length of one and one tenth (1.1) inches after release of the biasing and stretching force, the material would have recovered 90 percent (0.4 inch) of its elongation with reference to its unbiased length.

"High performance elastomers" are elastomers which, when formed into a film, strand or similar article, can be extended to a stretched length and retracted without experiencing a substantial loss in retractive force at an intermediate (lower) stretched length. These elastomers typically have useful properties of high strength, low hysteresis, low creep, a low percentage of set and low stress relaxation. High performance elastomers have a hysteresis value of 25% or less, suitably 20% or less, determined according to the hysteresis test method described herein.

"Low performance elastomers" are elastomers which, when formed into a film, strand or similar article, can be extended to a stretched length and retracted, but substantially lose their retractive force at an intermediate (lower) stretched length. These elastomers typically exhibit higher levels of hysteresis, creep and stress relaxation when stretched. Low performance elastomers have a hysteresis value greater than 25%, suitably 40% or more, determined according to the hysteresis test method described herein.

"Polymer" includes homopolymers, copolymers, such as for example, block, graft, random and alternating copolymers, terpolymers, etc., and blends and modifications thereof. The term "polymer" also includes all possible geometric configurations of the molecule. These configurations include, but are not limited to, isotactic, syndiotactic and random symmetries.

"Block copolymer" is a polymer in which dissimilar polymer segments, each including a string of similar monomer units, are connected by covalent bonds. For instance, a SBS block copolymer includes a string or segment of repeating styrene units, followed by a string or segment of repeating butadiene units, followed by a second string or segment of repeating styrene units.

"Blend" refers to a mixture of two or more polymers and/or additives.

"Nonwoven fabric or web" means a web having a structure of individual fibers or threads which are interlaid, but not in an identifiable manner as in a knitted or woven fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

"Spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

"Meltblown fibers" means fibers formed by extruding a molten thermoplastic material through a plurality of fine, usually circular, die capillaries as molten threads or filaments into converging high velocity, usually hot, gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are usually tacky when deposited onto a collecting surface.

"Ribbon" or "ribbon-shaped elements" means thermoplastic polymer filaments, film strips or other elongated elements having cross-sectional dimensions defining a flatness ratio of at least two. The "flatness ratio" is defined as the ratio of the longest cross-sectional dimension to the shortest cross-sectional dimension. For example, ribbon shaped elements may have rectangular, elliptical, or dumbbell-shaped cross-sections.

An "open configuration" or "open processing unit" refers to a system such as an electron beam or e-beam unit which is not fully encased in lead/steel shielding. An open processing unit may include an arcuate radiation shield that at least partially surrounds an adjacent roll. The roll may act as an electron collector which reduces radiation released to the surrounding environment.

A "closed configuration" or "closed processing unit" refers to a system such as an electron beam or e-beam unit which is encased by a lead/steel radiation shield having inlet and outlet openings.

"Personal care product" means diapers, training pants, absorbent underpants, adult incontinence products, and feminine hygiene products.

DETAILED DESCRIPTION OF THE INVENTION

The invention is directed to an apparatus for making an elastic laminate including a crosslinked elastic layer, wherein the elastic layer may include a styrenic block copolymer elastomer, an olefinic elastomer such as a semi-crystalline polyolefin plastomer or a propylene-ethylene copolymer, and/or other elastomeric material. The term "crosslinked elastic layer" includes any such layer in which at least some of the elastomer is crosslinked, with the crosslinking occurring after the elastic layer is formed.

Referring to FIG. 1, the apparatus 10 includes a die 12 for extruding a layer including a crosslinkable elastic copolymer 14, at least one roll 16 for conveying the extruded elastic layer 14, a supply source 18 for providing at least one nonwoven web 20, a lamination nip 22 for laminating the at least one nonwoven web 20 to the elastic layer 14, a processing unit 26 for crosslinking the elastic layer 14, and a winder 28 for collecting the elastic laminate 30.

The die 12 may be configured to extrude the crosslinkable elastic copolymer in the form of a film, a foam layer, an array of strands or fibers (e.g. substantially parallel strands or fibers), an array of ribbons, a nonwoven web (e.g. a spunbond web, meltblown web, or other nonwoven web), or a combination of the foregoing. Suitably, the die may be a filament die for extruding a plurality of substantially parallel, non-intersecting crosslinkable elastic filaments. Alternatively, the die may be a ribbon die for extruding a plurality of crosslinkable ribbon-shaped elastomeric elements such as disclosed in commonly owned U.S. Pat. No. 6,057,024 to Mleziva et al. which is incorporated herein by reference.

The crosslinkable elastic copolymer is suitably a thermoplastic elastomer which is not yet crosslinked. Crosslinking of the copolymer prior to extrusion may detrimentally impact the material flow properties of the material, thereby rendering the copolymer unsuitable for extrusion.

The crosslinkable elastic copolymer may include a crosslinkable styrenic block copolymer. Suitable styrenic block copolymer elastomers include styrene-diene and styrene-olefin block copolymers. Styrene-diene block copolymers include di-block, tri-block, tetra-block and other block copolymers, and may include without limitation styrene-isoprene, styrene-butadiene, styrene-isoprene-styrene, styrene-butadiene-styrene, styrene-isoprene-styrene-isoprene, and styrene-butadiene-styrene-butadiene block copolymers. Styrene-diene polymers which include butadiene (e.g. styrene-butadiene-styrene triblock copolymers) are particularly suitable. One commercially available styrene-butadiene-styrene block copolymer is VECTOR 8508, available from Dexco Polymers L.P. Examples of styrene-isoprene-styrene copolymers include VECTOR 4111A and 4211A, available from Dexco Polymers L.P.

Styrene-olefin block polymers include without limitation styrene-diene block copolymers in which the diene groups have been totally or partially selectively hydrogenated, including without limitation styrene-(ethylene-propylene), styrene-(ethylene-butylene), styrene-(ethylene-propylene)-styrene, styrene-(ethylene-butylene)-styrene, styrene-(ethylene-propylene)-styrene-(ethylene-propylene), and styrene-(ethylene-butylene)-styrene-(ethylene-butylene) block copolymers. In the above formulas, the term "styrene" indicates a block sequence of styrene repeating units; the terms "isoprene" and "butadiene" indicate block sequences of diene units; the term "(ethylene-propylene)" indicates a block sequence of ethylene-propylene copolymer units, and the term "(ethylene-butylene)" indicates a block sequence of ethylene-butylene copolymer units. The styrene-diene or styrene-olefin block copolymer should have a styrene content of about 10 to about 50% by weight, suitably about 15 to about 25% by weight, and should have a number average molecular weight of at least about 15,000 grams/mol, suitably about 30,000 to about 120,000 grams/mol, or about 50,000-80,000 grams/mol. Styrene-diene block copolymers may be particularly advantageous for subsequent crosslinking due to the additional unsaturation.

Other suitable crosslinkable styrenic block copolymers include styrene-diene block copolymers and styrene-olefin block copolymers such as those described above having varying levels of unsaturation.

The molecular weight of the styrenic block copolymer should be low enough that the styrenic block copolymer or polymer mixture can be formed into an elastic layer without inducing significant crosslinking during layer formation. The styrenic block copolymer or polymer mixture should be suitable for processing at temperatures below about 220° C., suitably below about 210° C., or about 125-200° C. The molecular weight range needed to achieve this objective will vary depending on the type of styrenic block copolymer, the amount and type of additional ingredients, and the characteristics of the elastic layer being formed.

The elastic layer may include at least about 25% by weight of the styrenic block copolymer elastomer, or at least about 40% by weight, or at least about 50% by weight, or at least about 75% by weight. The elastic layer may include up to 100% by weight of the styrenic block copolymer elastomer, or up to about 99.5% by weight, or up to about 95% by weight, or up to about 90% by weight, or up to about 80% by weight, or up to about 70% by weight. The styrenic block copolymer elastomer may include one or more styrenic block copolymers mixed together.

Alternatively or additionally, the crosslinkable elastic copolymer may include a crosslinkable olefin elastomer. Suitable crosslinkable olefin elastomers include semi-crystalline polyolefin plastomer available under the trade name VISTAMAXX from Exxon-Mobil Chemical Co. Other suitable crosslinkable olefin elastomers include propylene-ethylene copolymers available under the trade name VERSIFY from Dow Chemical Co.

Optional additional ingredients may form the balance of the elastic layer. Such ingredients include without limitation single-site catalyzed ethylene-alpha olefin copolymer elastomers having a density of less than about 0.915 grams/cm$^3$, suitably about 0.860-0.900 grams/cm$^3$, or about 0.865-0.895 grams/cm$^3$. These ethylene-alpha olefin copolymers may be formed using a $C_3$ to $C_{12}$ alpha-olefin comonomer, suitably a butene, hexene or octene comonomer. The amount of alpha olefin comonomer is about 5-25% by weight of the copolymer, suitably 10-25% by weight, and varies with the desired density. Suitable single-site catalyzed ethylene-alpha olefin copolymers are made and sold by Dow Chemical Co. under the trade names AFFINITY and ENGAGE, and by ExxonMobil Chemical Co., under the trade names EXACT and EXCEED.

Other optional ingredients include non-elastomeric polymers such as polyethylene, polypropylenes and other polyolefins, as well as other elastomeric polymers. When present, inelastic polymers should be employed in relatively minor amounts so as not to overcome the elastomeric characteristics of the crosslinked elastic layer.

Other optional ingredients include processing aids which assist in formation of the elastic layer at temperatures low enough to avoid significant premature crosslinking. One suitable processing aid is a polyolefin wax, for instance a branched or linear low density polyethylene wax having a density of about 0.860-0.910 grams/cm$^3$, and a melt index of about 500-4000 grams/10 min. measured using ASTM D1238 at a temperature of 190° C. and a load of 2160 grams. Examples of polyethylene waxes include EPOLENE C-10 available from the Eastman Chemical Co. and PETROTHANE NA601 available from Quantum Chemical Co. Other examples include wax-like high melt index (low molecular weight) single-site catalyzed olefin polymers available from Dow Chemical Co. under the trade name AFFINITY, for instance AFFINITY 1900 and 1950 polyolefin plastomers.

Another suitable processing aid is a styrene-based hydrocarbon tackifier having a weight average molecular weight of about 500-2500. One example is REGALREZ 1126 tackifier, available from Eastman Chemical Co. Castor oil is another suitable processing aid. Mineral oil is a further suitable processing aid. Processing aids may together constitute about 0.1-50% by weight, suitably about 5-30% by weight of the elastic layer, or about 10-20% by weight of the elastic layer. When castor oil is used, it should be present in amounts suitable for crosslinking aids.

Other optional ingredients include crosslinking aids, i.e. additives which assist in crosslinking the formed elastic layer. One or more crosslinking aids may together constitute about 0.1-10% by weight, suitably about 0.5-5% by weight of the elastic layer. Castor oil is one such aid. Castor oil is a natural triglyceride that contains three oleic chains, each having one degree of unsaturation. Castor oil is polymerizable if subjected to an initiation source such as electron beam radiation. Castor oil is thermally stable at up to about 275° C., and can be processed in an extruder along with the styrenic block copolymer elastomer without degrading. The resulting elastic layer can be polymerized (crosslinked) using a high energy radiation source, such as an electron beam. Due to the presence of three unsaturated chains on each castor oil molecule, the castor oil will assist three-dimensional crosslinking through chain transfer reactions with adjacent polymer chains.

Other crosslinking aids include without limitation multifunctional acrylate and allyl derivatives such as diethylene glycol dimethacrylate, dimethylene glycol acrylate, trimethylpropane diallyl ether, triethylene glycol dimethacrylate, and other multifunctional monomers which have adequate thermal stability in a melt extrusion process. Other crosslinking aids include polymers and oligomers having secondary carbons in a polymer backbone or side chains, as well as unsaturated double bonds. The benefits of crosslinking the elastic layers include, without limitation, a) less aging behavior, as evidenced by little or no loss in tension when the elastic layer is wound and stored on a roll, b) better temperature stability, evidenced by the ability to store and transport the elastic material without refrigeration, and c) stronger adhesion, if the elastic layer is crosslinked after lamination to the other layers.

Other optional ingredients include particulate inorganic or organic fillers. Generally, the filler particles have mean particle sizes of about 0.5-8 microns, suitably about 1-2 microns. Suitable inorganic fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, calcium oxide, magnesium oxide, aluminum hydroxide and the like. Suitable organic fillers include cellulose, cyclodextrins, and cage molecules (e.g. polyhedral oligomeric silsesquioxane nanostretched chemicals). When used, the filler particles may constitute about 20-75% by weight of the elastic film, suitably about 30-60% by weight.

Thermal polymerization of diene-containing polymers is typically accomplished by a free radical polymerization mechanism which involves initiation, propagation and termination. Free radical initiators such as peroxides are typically used for the initiation of free radical polymerization. When heated, the initiator breaks and creates a radical which attacks the double-bond in the diene-containing segments of the polymer which in turn creates another radical which propagates the process. In the present invention, crosslinking of styrenic block copolymers may be achieved by exposing diene bonds located in the rubbery domains of the styrenic block copolymer (i.e., the butadiene or isoprene segments) to a high energy source such as electron beam radiation. Upon exposure to the high energy source, the diene bonds break forming free radicals which recombine in new orientations forming a crosslinked molecular network.

The elastic layer 14 may be laminated to at least one nonwoven web 20. The nonwoven web may be formed from a wide variety of polymers, may or may not be crosslinked, and may or may not be elastic. Suitable inelastic polymers include polyolefins such as homopolymers of ethylene, propylene and butylene, and copolymers of these monomers including up to 10% (suitably up to 5%) by weight of an alpha-olefin comonomer having up to about 12 carbon atoms. Inelastic polymers also include certain polyamides, polyesters and the like. Suitable elastic polymers include copolymers of ethylene, propylene and butylene with an alpha-olefin comonomer which generally contains more than 10% but less than 90% by weight of each comonomer. Elastic olefin copolymers include, for instance, single-site catalyzed copolymers of ethylene with more than 10% by weight of an alpha-olefin comonomer, having a density of about 0.855 to 0.900 grams/cm$^3$. Suitable elastic polymers for the nonwoven layer also include ethylene vinyl acetate, ethylene ethyl acrylate, ethylene methyl acrylate, ethylene butyl acrylate, polyurethane, block co-poly(ether-ester) and block co-poly(amide-ether). Additional suitable elastic polymers for the nonwoven layer include elastic olefin polymers such as semi-crystalline polyolefin plastomers available under the trade name VISTAMAXX from Exxon-Mobil Chemical Co. and propylene-ethylene copolymers available under the trade name VERSIFY from Dow Chemical Co.

The elastic layer and the nonwoven web(s) may be joined together using a variety of thermal, adhesive, ultrasonic and other processes suitable for a variety of applications. A pressure-sensitive adhesive may also be employed. The pressure sensitive composition may include about 10% to about 70% of a tackifier sold by Eastman Chemical Co. under the trade name REGALREZ 1126. The form of the elastic layer (whether film, foam, nonwoven web, net or filament array), and the form and polymer type used in the nonwoven web(s) (whether elastic or inelastic) will depend largely on the process and the end use application.

Once the elastic layer 14 is formed, it may be crosslinked by passing it through a processing unit 26. The elastic layer 14 may be crosslinked before lamination to the nonwoven web(s) as shown, for example, in FIGS. 1-5 and 7-9, or after lamination to the nonwoven web(s) as shown in FIG. 6.

The processing unit 26 may emit or apply electron beam or e-beam radiation, ultraviolet radiation, gamma radiation, or another suitable media to the elastic layer to affect crosslinking of the styrenic block copolymer. The amount of radiation required will depend on the line speed, the amount of crosslinking desired, the type of radiation used and, the thickness and/or the specific composition of the elastic layer. For purposes of this invention, the elastic layer is considered to be a "crosslinked elastic layer" when its percent load loss is reduced by at least 5%, or at least 10%, or at least 20%, compared to its percent load loss prior to crosslinking, using the test procedure described below. For example, if an elastic layer demonstrates a percent load loss of 65% prior to crosslinking, then the elastic layer will be considered crosslinked if a crosslinking treatment causes its percentage load loss to fall to not more than 60% (a 5% reduction), or not more than 55% (a 10% reduction), or not more than 45% (a 20% reduction).

Suitably, the processing unit 26 may be an electron beam processing unit having an open or a closed configuration. Suitable electron beam units include low voltage units designed for web based application. "Low voltage" refers to units with output voltages ranging between 0-500 kV. Examples of electron beam processing units suitable for use in the apparatus include, but are not limited to, units from the BROADBEAM line of industrial electron beam processors available from PCT Engineered Systems, LLC of Davenport, Iowa, units from the ELECTROCURTAIN line of industrial electron beam processors available from Energy Sciences, Inc. of Wilmington, Mass., and units from the AEB modular line of industrial electron beam processors available from Advanced Electron Beams of Wilmington, Mass.

The electron beam processing unit may operate between about 50 to about 500 kV, suitably between about 100 to about 300 kV, or about 150 kV. The electron beam processing unit may deliver about 2 to about 30 MRads, suitably about 5 to about 15 MRads or about 10 MRads of electron beam radiation to the elastic layer.

Figure 5:
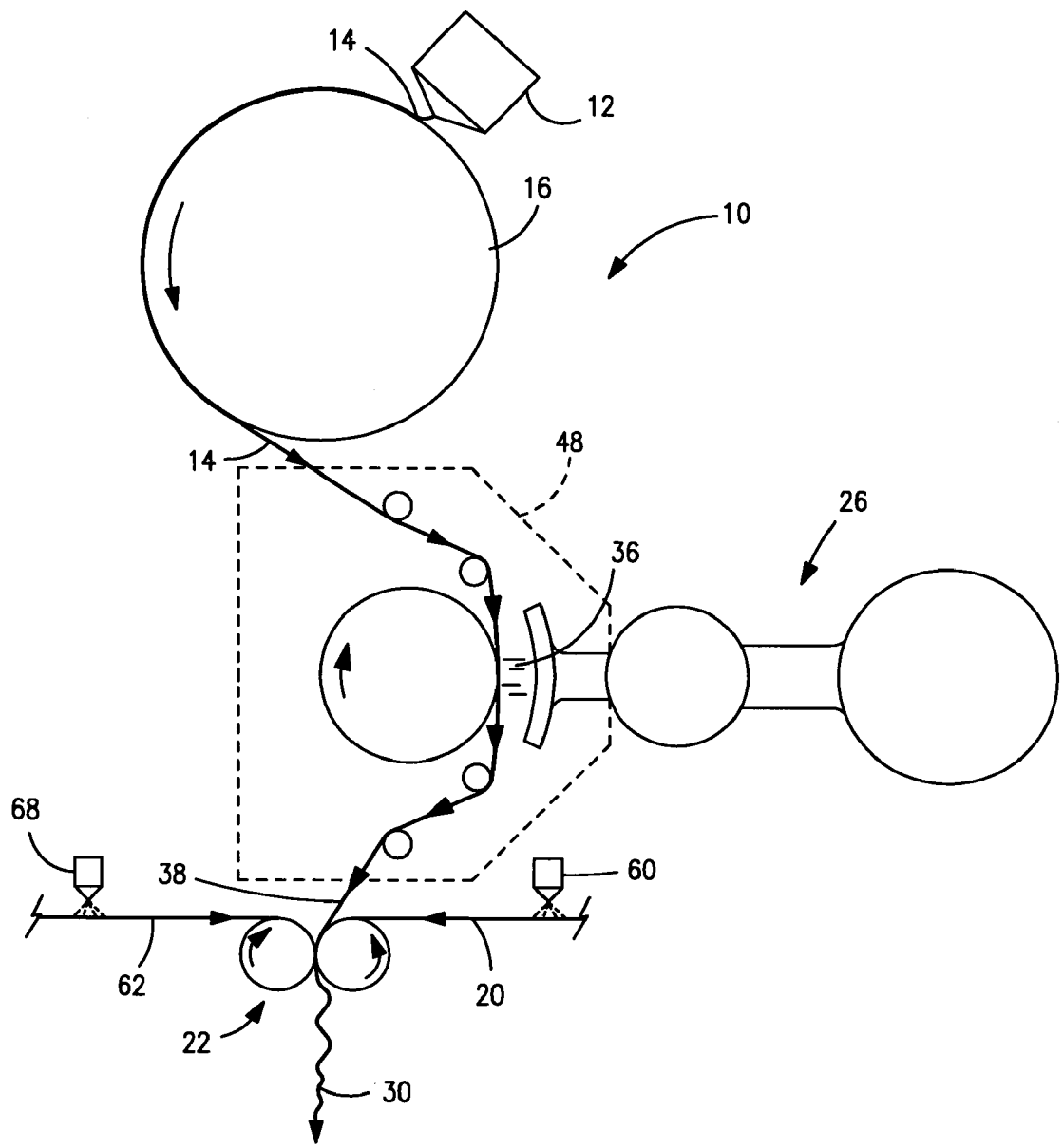
FIG. 5 illustrates the apparatus of FIG. 1 wherein a second roll has been removed and replaced by a processing unit for crosslinking an elastic copolymer.
Figure 6:
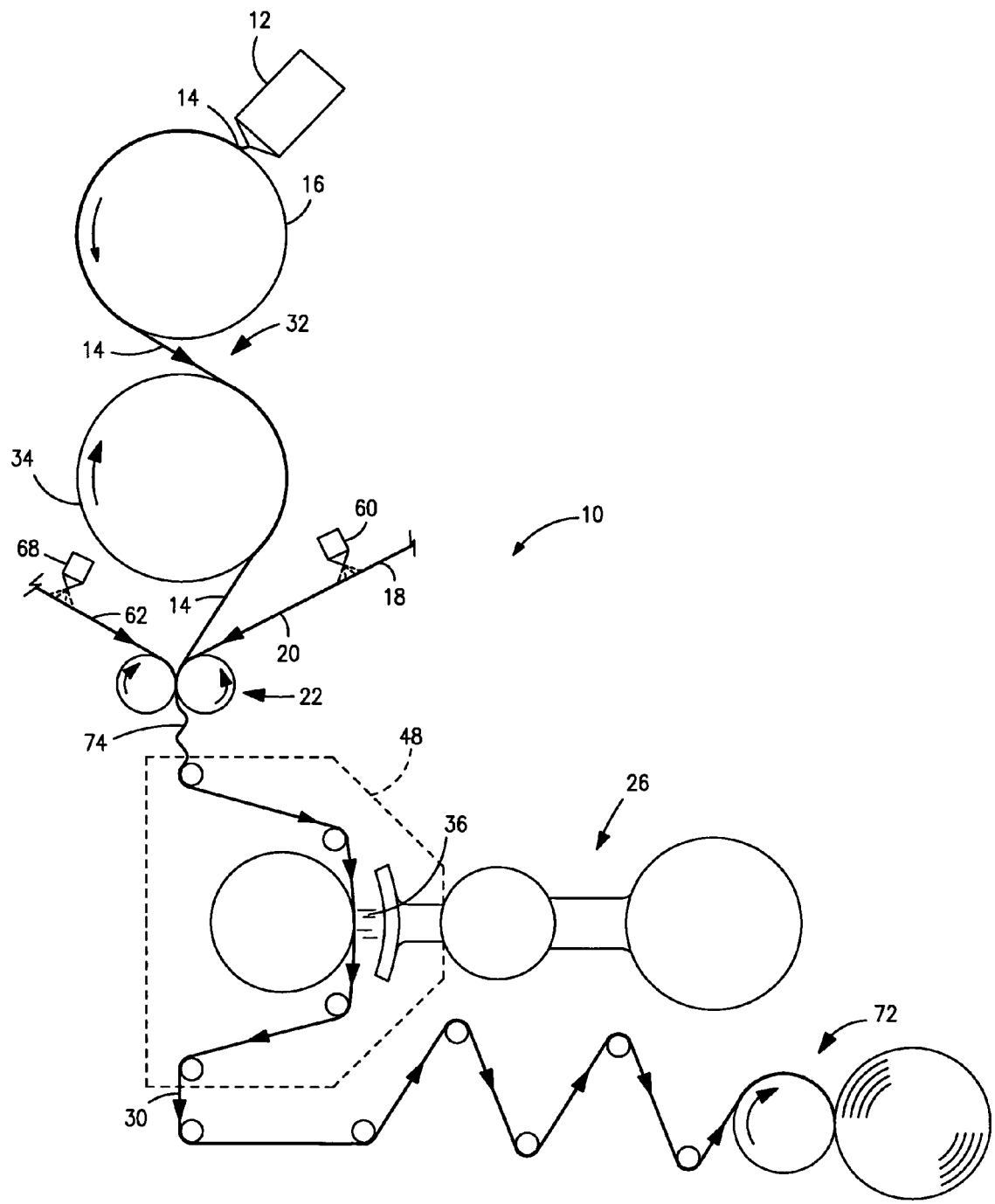
FIG. 6. illustrates an apparatus for making vertical filament laminates wherein a processing unit for crosslinking an elastic copolymer is positioned after a lamination nip.
Figure 7:
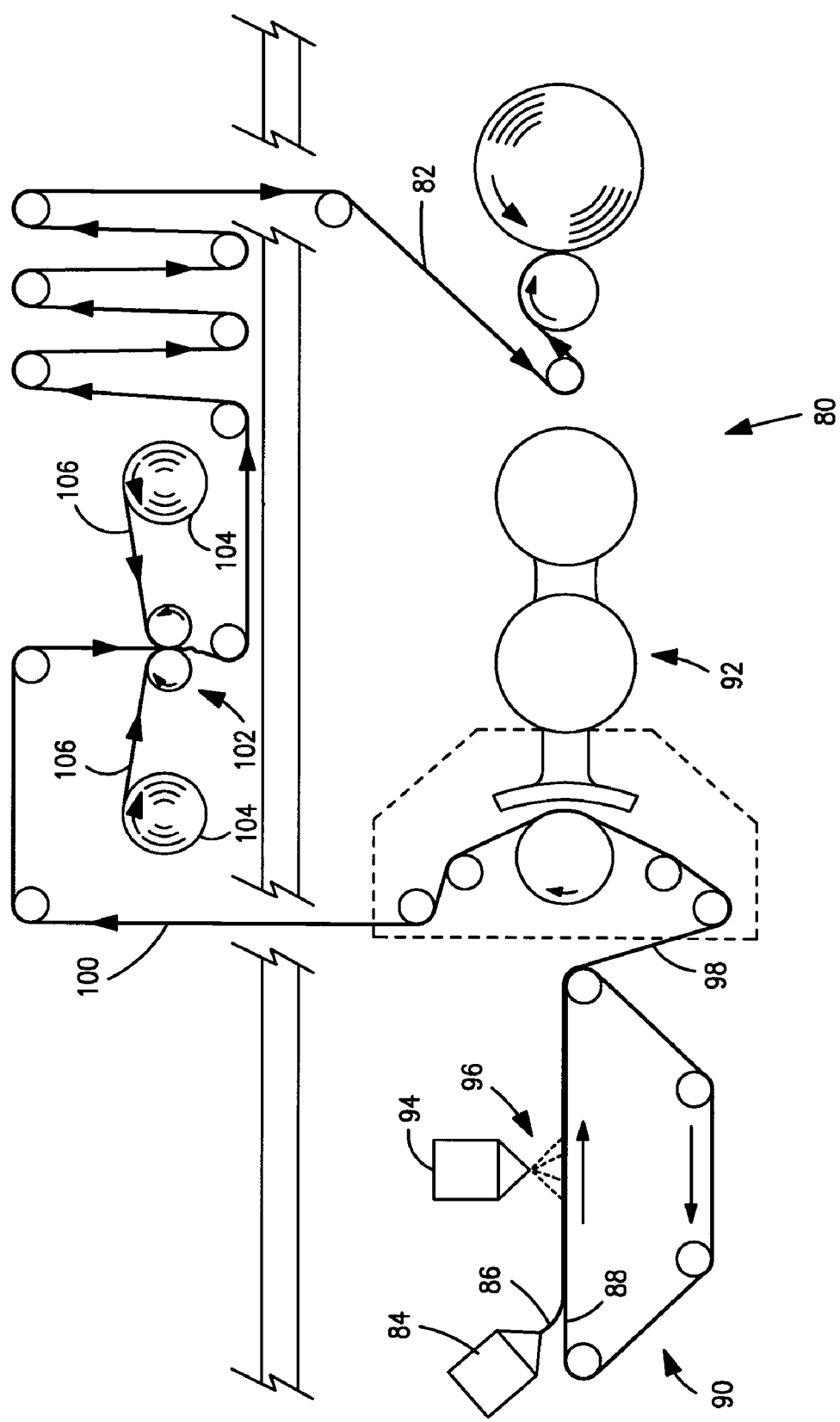
FIG. 7 illustrates an apparatus for making continuous filament stretch bonded laminates wherein a processing unit for crosslinking an elastic copolymer is positioned adjacent a web former.
Figure 8:
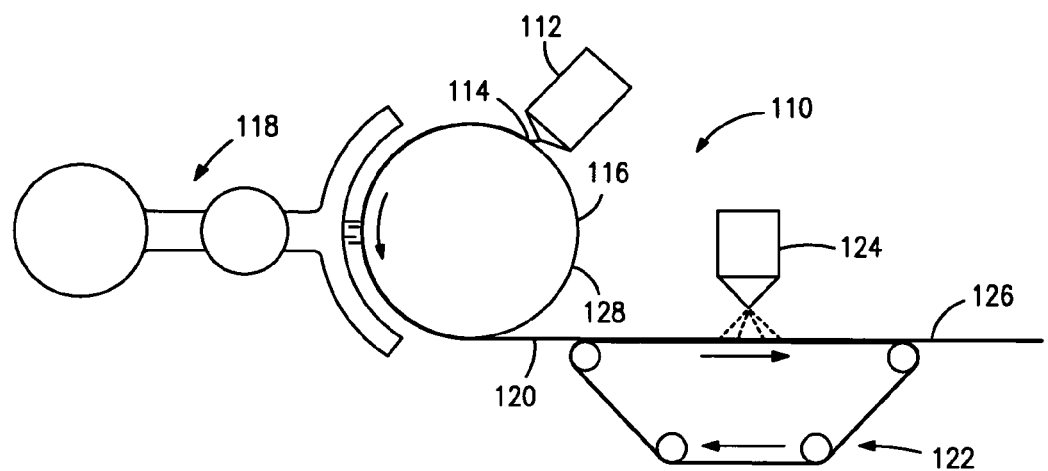
FIG. 8 illustrates an apparatus for making hybrid vertical filament-continuous filament stretch bonded laminates wherein an open processing unit for crosslinking an elastic copolymer is positioned between a roll and a web former.
Figure 9:
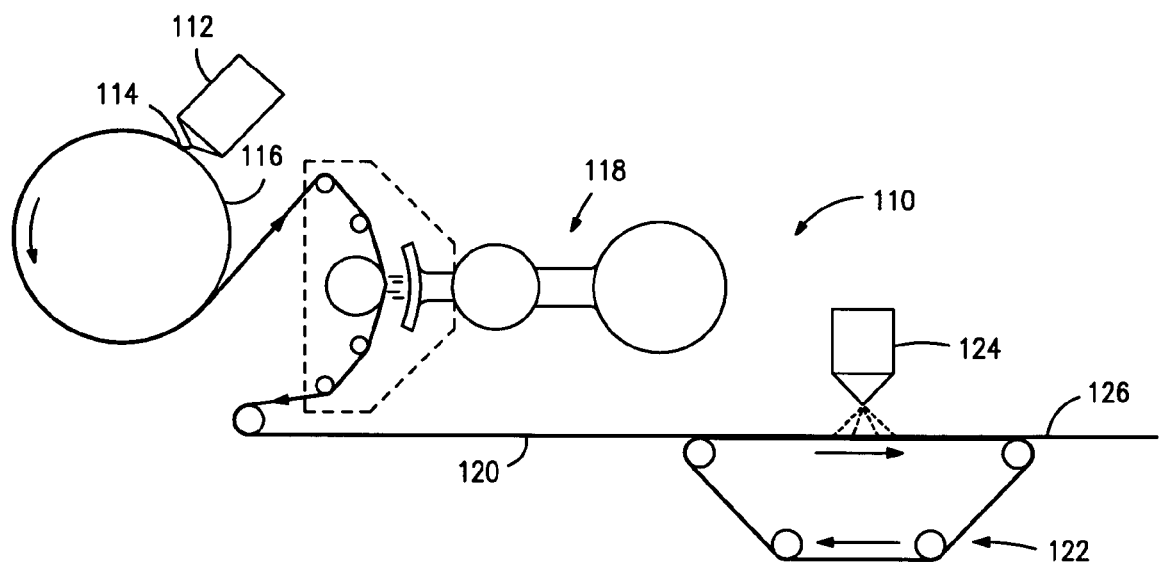
FIG. 9 illustrates an apparatus for making hybrid vertical filament-continuous filament stretch bonded laminates wherein a closed processing unit for crosslinking an elastic copolymer is positioned between a web former and a lamination nip.

FIGS. 1 through 9 illustrate apparatus for making an elastic laminate including a crosslinked elastic layer formed of a crosslinkable elastic copolymer. In particular, FIGS. 1-6 illustrate apparatus for making a vertical filament laminate (VFL), FIG. 7 illustrates an apparatus for making a continuous filament stretch bonded laminate (CFSBL) and FIGS. 8 and 9 illustrate apparatus for making a hybrid vertical filament-continuous filament stretch bonded laminate (VFL/CFSBL). While the figures illustrate VFL, CFSBL and VFL/CFSBL apparatus and processes it will be appreciated that other apparatus and processes consistent with the present invention may be used.

Referring to FIG. 1, a die 12 extrudes a layer 14 of crosslinkable elastic copolymer such as an elastic styrenic block copolymer. The elastic layer 14 may be in the form of a plurality of ribbons or parallel filaments. The crosslinkable elastic layer 14 is fed to a first roll 16 and is conveyed under tension through a gap 32 between the first roll 16 and a second roll 34. The elastic layer 14 is conveyed into the processing unit 26 and passed through a treatment zone 36 to form a crosslinked elastic layer 38. The elastic layer 14 may be conveyed through the processing unit 26 to the lamination nip 22 by one or more fly rollers 40 and a grounding roll 42. The grounding roll 42 is suitably positioned adjacent the treatment zone 36 to support and maintain the elastic layer 14 within the treatment zone 36 and to affect crosslinking of the styrenic block copolymer.

In VFL processes the distance between the rolls 16, 34 and the lamination nip 22 is carefully controlled such that the linear distance the elastic filaments have to travel between the two points is minimized. As the distance between the rolls and the lamination nip increases movement of the elastic filaments become harder to control. Filament control is an important consideration as the tacky filaments will have a tendency to stick together if they touch other filaments. To control filament movement while they are being conveyed from the rolls 16, 34 to lamination nip 22, a vacuum conveyor 25 may be positioned between the second roll 34 and the processing unit 26 to control and/or direct movement of the elastic layer 14 into the processing unit 26. In another embodiment, the vacuum conveyor 25 may be disposed within the processing unit 26. Alternative methods of filament control including, but not limited to, a non-vacuum conveyor, grooved filament transport rolls, increased filament tension and/or improved control of entrained air may be used to convey the elastic layer 14 from the second roll 34 to the lamination nip 22.

Figure 2:
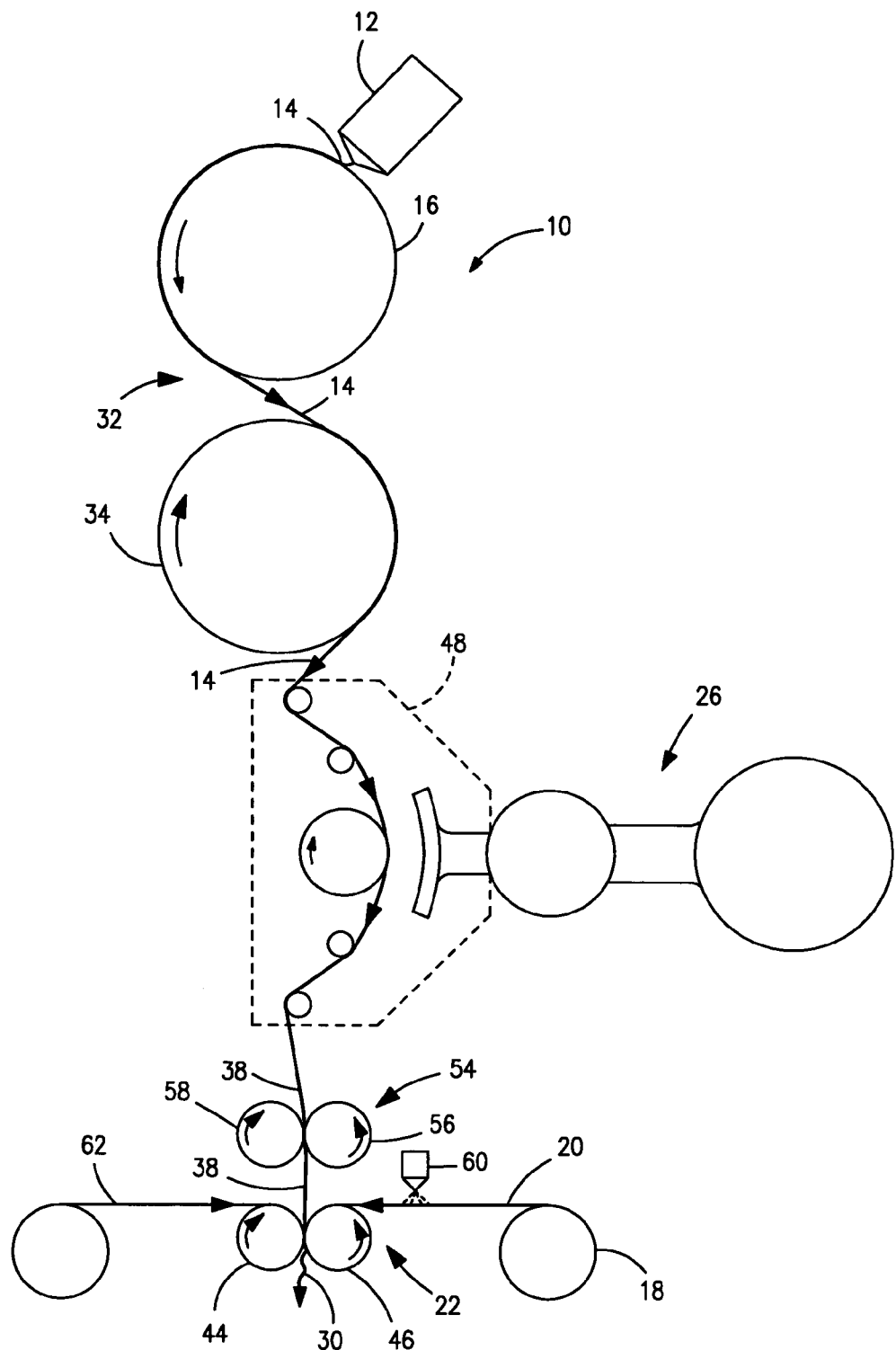
FIG. 2 illustrates the apparatus of FIG. 1 further including a control nip disposed between the processing unit and the lamination nip.

Referring to FIG. 2, a control nip 54 between a roll 56 and a roll 58 may be positioned between the processing unit 26 and the lamination nip 22 to control movement of crosslinked elastic layer 30 between the two points.

The processing unit 26 may have a closed configuration including a shielding enclosure 48 (shown in cutaway) which encloses the treatment zone 36. When the processing unit 26 is a closed electron beam or e-beam processing unit, the shielding enclosure 48 suitably contains stray radiation within the enclosure area. As shown in FIG. 1, the closed electron beam processing unit 26 includes a vacuum chamber 50 and a high voltage power supply 52 for generating electron beam radiation. Although FIG. 1 depicts a closed electron beam processing unit, any other suitable processing unit capable of supplying an appropriate energy source for affecting crosslinking of the styrenic block copolymer including, but not limited to, gamma radiation and ultraviolet (UV) radiation, may be used.

Figure 3:
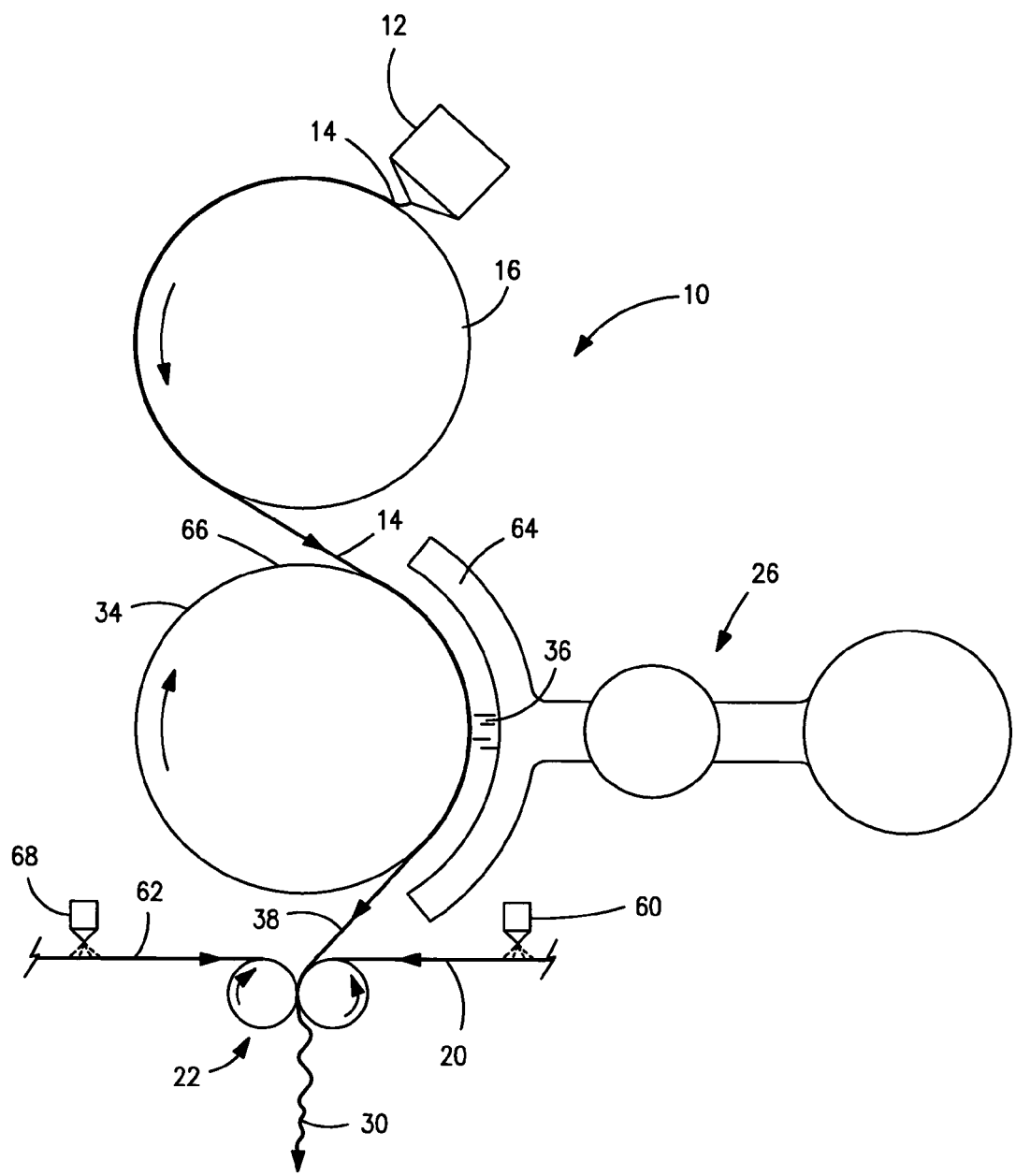
FIG. 3 illustrates an apparatus for making vertical filament laminates wherein an open processing unit for crosslinking an elastic copolymer is positioned adjacent an outer surface of a first roll.
Figure 4:
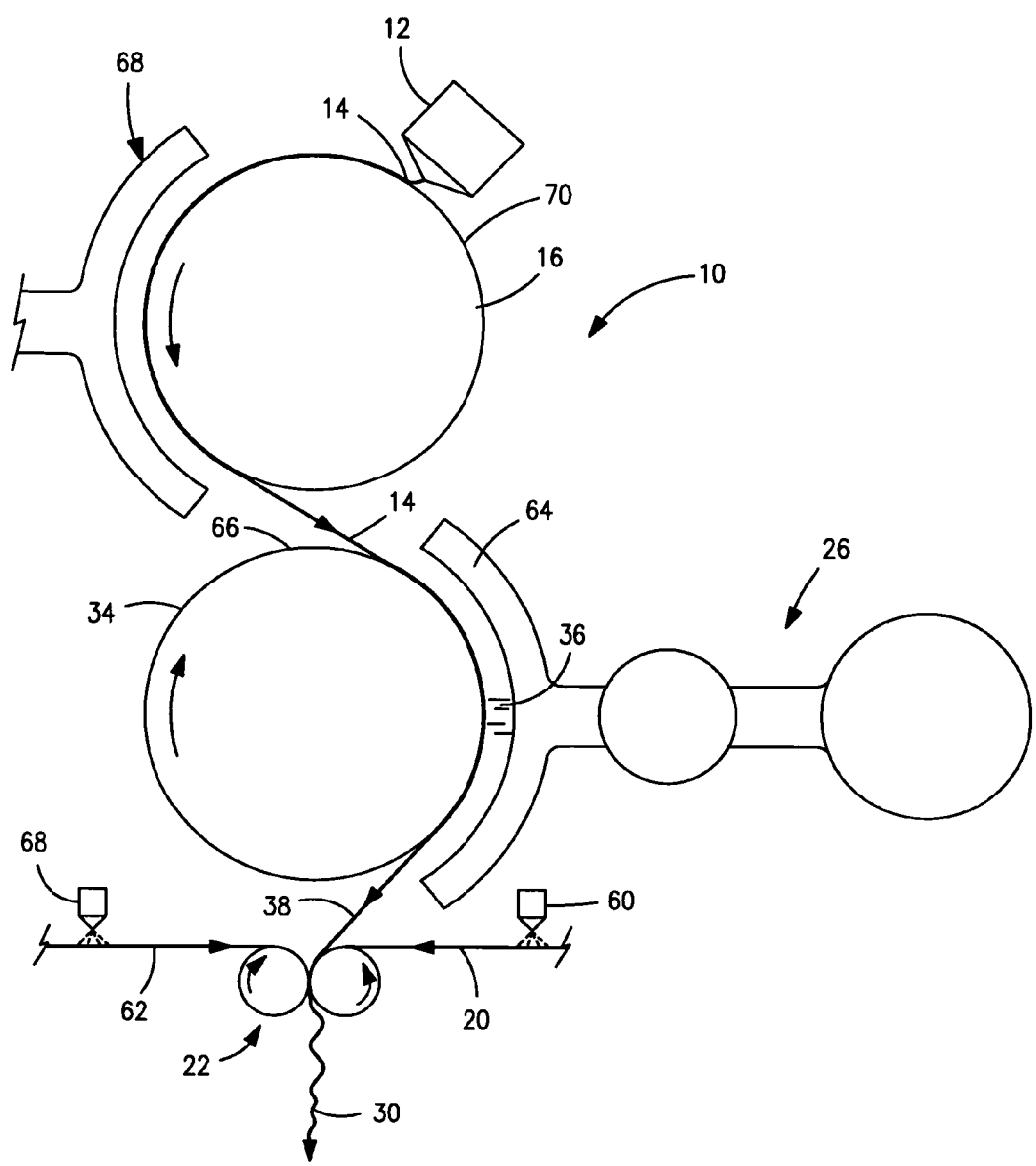
FIG. 4 illustrates the apparatus of FIG. 3 further including a second open processing unit positioned adjacent an outer surface of a second roll.

Alternatively, as shown in FIGS. 3 and 4, the processing unit 26 may be an electron beam or e-beam processing unit having an open configuration including an arcuate radiation shield 64. Suitably, the processing unit 26 is positioned adjacent an outer surface 66 of the second or lower roll 34 such that the treatment zone 36 is disposed between the radiation shield 64 and the second roll 34. The second roll 34 acts as an electron collection device and also absorbs radiation generated by the electron beam. The second roll 34 suitably includes a plasma release coating to control adhesion and/or release of the elastic layer 14 from the roll 34. This configuration provides standard filament quenching capacity while not requiring additional headroom to mount the processing unit 26 between the second roll 34 and the lamination nip 22. As shown in FIG. 4, a second processing unit 68 may be positioned adjacent an outer surface 70 of the first or upper roll 16.

As shown in FIG. 5, the second or lower roll 34 may be removed and a processing unit 26 such as a closed electron beam processing unit may be positioned between the roll 16 and the lamination nip 22. Such a configuration may be of particular advantage where available headroom is of concern.

Certain efficiency advantages may be obtained by crosslinking the styrenic block copolymer before it reaches room temperature. To control and/or adjust the temperature of the elastic layer 14 prior to crosslinking, processing unit 26 may include a quenching system (not shown). Suitable quenching systems may include an integral air or surface contact filament quenching system to carefully adjust filament temperature before crosslinking is initiated.

Referring again to FIG. 1, a supply source 18 such as an unwind roll feeds a nonwoven web 20 toward the lamination nip 22 between a lamination roll 44 and a lamination roll 46. The elastic laminate 30 is formed by joining, bonding or laminating the crosslinked elastic layer 38 to the nonwoven web 20. The crosslinked elastic layer 38 and the nonwoven web 20 may be joined together using a variety of thermal, adhesive, ultrasonic and other processes suitable for a variety of applications. A pressure-sensitive adhesive may also be employed. As shown in FIG. 2, an adhesive die 60 may be positioned above the nonwoven web 20 to apply an adhesive such as, for example, a hot melt adhesive.

As shown in FIG. 2, a second nonwoven web 62 may be conveyed to the lamination nip 22 and joined, bonded or laminated to the crosslinked elastic layer 38.

The elastic laminate 30 may be conveyed from the lamination nip 22 to a winder 30 to collect the laminate for storage and later use. Alternatively, the elastic laminate 30 may be conveyed to another apparatus (not shown) such as, for example, a personal care product machine, for incorporation into a finished product or a finished product intermediate.

Referring to FIG. 6, a VFL apparatus for making an elastic laminate 30 including a crosslinked elastic layer is illustrated wherein the processing unit 26 is positioned between the lamination nip 22 and a winder 72. A laminate 74 including the nonwoven webs 20 and 62 and an elastic layer 14 is conveyed the through processing unit 26 to affect crosslinking of the elastic copolymer and form the elastic laminate 30. In this embodiment, laminate properties may be customized by the amount of retraction the laminate 74 is allowed to take before crosslinking. This customization allows for making form-to-fit fabrics that will stress relax to a prescribed amount while utilizing a single polymer source versus utilizing a variety of polymers to achieve various property sets. The embodiment shown in FIG. 6 also allows for the use of certain crosslinking or crosslinkable adhesives that may provide improved durability to the elastic laminate 30. Elastic laminates including crosslinking adhesives may be used to make durable fabrics which can withstand higher temperatures associated with washing, drying and/or repeated use, while maintaining a low laminate cost.

Radiation dosages applied to the laminate 74 may need to be closely controlled. At higher dosages e-beam or electron beam treatment may damage polypropylene nonwoven facings but at a controlled level of crosslinking, e-beam treatment may provide additional benefits. Radiation dosages applied to the laminate 74 when one or both of the nonwoven webs 20, 62 include polypropylene may be up to about 20 MRads, suitably about 2 to about 10 MRads, or about 4 to about 8 MRads. Nonwoven facings including polyethylene, single-site catalyzed ethylene-alpha olefin copolymer elastomers such as disclosed above, semi-crystalline polyolefin elastomers and propylene-ethylene elastomers such as disclosed above, and/or styrenic block copolymer elastomers may be used in place of polypropylene.

Referring to FIG. 7, an apparatus 80 for making a continuous fiber stretch bonded elastic laminate 82 includes a die 84 for extruding a layer of crosslinkable elastic copolymer 86 onto a foraminous surface 88 of a web former 90. Suitably, the die 84 includes a filament die for extruding a plurality of parallel filaments. The web former 90 conveys the extruded elastic layer 86 beneath a meltblown die 94 positioned above the foraminous surface 88. The meltblown die 94 applies a random array of elastomeric fibers 96 which overlay extruded the elastic layer 86 to form a composite elastic layer 98. The composite elastic layer 98 is conveyed to a processing unit 92 wherein the elastic copolymer is crosslinked to form a crosslinked elastic layer 100. The crosslinked elastic layer 100 is conveyed to a lamination nip 102. A supply source 104 provides at least one nonwoven web 106 which is conveyed to the lamination nip 102 where the nonwoven web or webs are bonded, joined or laminated to the crosslinked elastic layer 100 to form the elastic laminate 82.

FIGS. 8 and 9 illustrate an apparatus for making a hybrid vertical filament-continuous filament stretch bonded laminate. The apparatus 110 includes a die 112 which extrudes a layer including a crosslinkable elastic copolymer 114 onto a roll 116. Suitably, the die 112 is a filament die which extrudes a plurality of parallel filaments. The crosslinkable layer 114 is conveyer through a processing unit 118 to form a crosslinked elastic layer 120. The crosslinked elastic layer 122 is conveyed by a web former 122 beneath a meltblown die 124. The meltblown die 124 applies a random array of elastomeric fibers which overlay the crosslinked elastic layer 120 to form a composite elastic layer 126. The composite elastic layer 126 may be conveyed to a lamination nip (not shown) where it may be joined, bonded or laminated to at least one nonwoven web.

As shown in FIG. 8, the processing unit 118 may be positioned adjacent an outer surface 128 of the roll 116. Suitably, the processing unit 118 may have an open configuration and/or may be an open electron beam processing unit. In this embodiment, the crosslinkable elastic layer 114 may be quenched as it is being crosslinked.

As shown in FIG. 9, the processing unit 118 may be positioned between the roll 116 and the web former 122. Suitably, the processing unit 118 may have a closed configuration and/or may be a closed electron beam processing unit. In this embodiment, the crosslinkable elastic layer 114 may be at least partially quenched before it enters the processing unit 118.

FIGS. 1 and 2 schematically illustrate a method for making a vertical filament elastic laminate 30 including an elastic layer of crosslinked elastic copolymer filaments. The method includes providing a die 12, extruding a layer 14 formed of a crosslinkable elastic styrenic block copolymer onto a first roll 16, conveying the extruded elastic layer 14 through a gap 32 between the first roll 16 and a second roll 34 to vertically stretch the elastic layer 14, conveying the elastic layer 14 in a stretched, tensioned condition through a processing unit 26, crosslinking the elastic copolymer by passing the elastic layer 14 through a treatment zone 36 disposed within the processing unit 26 to form a crosslinked elastic layer 38, conveying the crosslinked layer 38 in a stretched, tension condition to a lamination nip 22, providing at least one nonwoven web 20 and forming the elastic laminate 30 by passing the crosslinked elastic layer 38 and the nonwoven web 20 through the lamination nip 22.

As shown in FIG. 2, the method may further include passing the crosslinked elastic layer 38 in a stretched, tensioned condition through a control nip 54, applying an adhesive to the nonwoven web 20, providing a second nonwoven web 62, applying an adhesive to the second nonwoven web 62 and forming the elastic laminate 30 by passing the nonwoven web 20, the crosslinked elastic layer 38 in a stretched, tensioned condition, and the second nonwoven web 62 through the lamination nip 22.

FIG. 6 schematically illustrates another method for making a vertical filament laminate 30 including an elastic layer 20 formed of a crosslinked elastic copolymer. The method includes extruding a layer 14 of crosslinkable elastic copolymer filaments onto a first roll 16, passing the extruded elastic layer 14 through a gap 32 between the first roll 16 and a second roll 34 to form a vertically stretched elastic layer 14, conveying the stretched elastic layer 14 to a lamination nip 22 in a stretched, tensioned condition, providing a first nonwoven web 20, applying an adhesive to the first nonwoven web 20, providing a second nonwoven web 62, applying an adhesive to the second nonwoven web 62, forming a laminate 74 by passing the first nonwoven web 20, the stretched elastic layer 14 and the second nonwoven web 62 through the lamination nip 22 to form a laminate 74, relaxing the laminate 74, conveying the laminate 74 through a processing unit 26 and forming the VFL 30 by passing the laminate 74 through a treatment zone 36 disposed within the processing unit 26 to crosslink the elastic copolymer.

FIG. 7 schematically illustrates a method for making a continuous filament stretch bonded laminate 82 including a crosslinked elastic layer. The method includes extruding a layer 86 including a crosslinkable elastic copolymer onto a web former 90, applying a random array of elastomeric meltblown fiber which overlay the extruded elastic layer 86 to form a composite elastic layer 98, conveying the composite elastic layer 98 through a processing unit 92, forming a crosslinked elastic layer 100 by crosslinking the elastic copolymer, stretching the crosslinked elastic layer 100, conveying the crosslinked elastic layer 100 to a lamination nip 102 in a stretched, tensioned condition, providing at least one nonwoven web 106, and forming the CFSBL 82 by passing the crosslinked elastic layer 100 and at least one nonwoven web 106 through the lamination nip 102.

FIGS. 8 and 9 schematically illustrate a method for making a hybrid vertical filament—continuous filament stretch bonded laminate (VFL/CFSBL) including a crosslinked elastic layer. The method includes extruding a layer 114 of a crosslinkable elastic copolymer onto a roll 116, passing the extruded layer 114 through a processing unit 118, crosslinking the elastic copolymer to form a crosslinked elastic layer 120, conveying the crosslinked elastic layer 120 onto a web former, applying a random array of elastomeric meltblown fibers onto the crosslinked elastic layer 120 to form a composite elastic layer 126, conveying the composite elastic layer 126 in a stretched, tensioned condition to a lamination nip and forming the VFL/CFSBL by laminating the composite elastic layer 126 to at least one nonwoven web.

The elastic laminates can be used in a wide variety of disposable articles, including without limitation garments, infection control products, and personal care products as defined above. The elastic laminates perform as high performance elastic materials in these applications and have hysteresis values less than 25%, suitably less than 20%, or less than 15%.

While the embodiments of the invention disclosed herein are exemplary, various modifications and improvements can be made without departing from the spirit and scope of the invention. The scope of the invention is indicated by the appended claims, and all changes that fall within the meaning and range of equivalents are intended to be embraced therein.

We claim:

1. An apparatus for making an elastic laminate comprising:
    a die for extruding a layer comprising a crosslinkable styrenic block copolymer;
    a roll for conveying the extruded layer;
    a supply source for providing at least one nonwoven web;
    a lamination nip for laminating the at least one nonwoven web to the extruded layer;
    a processing unit for crosslinking the extruded styrenic block copolymer, wherein the processing unit is disposed between the die and the lamination nip;
    a vacuum conveyor to control movement of the extruded layer between the roll and the lamination nip, wherein the vacuum conveyor is disposed within the processing unit; and
    a winder for collecting the elastic laminate.

2. The apparatus of claim 1, wherein the die comprises a filament die for extruding a plurality of parallel crosslinkable styrenic block copolymer filaments.

3. The apparatus of claim 1, wherein the die comprises a ribbon die for extruding a plurality of crosslinkable ribbon-shaped elements.

4. The apparatus of claim 1, wherein the processing unit comprises an electron beam processing unit.

5. The apparatus of claim 4, wherein the electron beam processing unit operates between about 100 to about 300 kV and delivers about 2 to about 30 MRads to the elastic layer.

6. The apparatus of claim 1, further comprising at least one control nip positioned between the processing unit and the lamination nip.

7. The apparatus of claim 1, wherein the processing unit comprises a quenching system to adjust the temperature of the layer prior to crosslinking.

8. An apparatus for making an elastic laminate, comprising:
    a filament die for extruding a plurality of parallel filaments comprising a crosslinkable elastic styrenic block copolymer;
    an upper roll;
    a lower roll;
    a first processing unit positioned adjacent an outer surface of one of the upper roll and the lower roll for crosslinking the plurality of elastic filaments, the first processing unit including an arcuate radiation shield extending adjacent a portion of the one of the upper roll and the lower roll;
    a supply source for providing at least one nonwoven web;
    a lamination nip for joining the plurality of elastic filaments to the nonwoven web; and
    a second processing unit positioned adjacent an outer surface of the other of the upper roll and the lower roll.

9. The apparatus of claim 8, wherein the first and second processing units are positioned on opposite sides of the apparatus.

10. An apparatus for making an elastic laminate, comprising:
- a filament die for extruding a plurality of parallel filaments comprising a crosslinkable elastic styrenic block copolymer;
- a meltblown die positioned above a web former for applying a random array of elastomeric fibers which overlay the parallel filaments;
- a roll disposed between the filament die and the web former; a supply source for providing at least one nonwoven web;
- a lamination nip for joining the overlaid web of parallel filaments and meltblown fibers and the at least one nonwoven web; and
- a processing unit for crosslinking the elastic styrenic block copolymer parallel filaments, wherein the processing unit is disposed adjacent an outer surface of the roll or the processing unit is disposed between the roll and the web former.

11. The apparatus of claim 10, wherein the processing unit is disposed adjacent an outer surface of the roll and the processing unit comprises an open electron beam processing unit.

12. The apparatus of claim 10, wherein the processing unit is disposed between the roll and the web former and the processing unit comprises a closed electron beam processing unit.

13. An apparatus for making an elastic laminate, comprising:
- a filament die for extruding a plurality of parallel filaments comprising a crosslinkable elastic styrenic block copolymer;
- an upper roll;
- a lower roll;
- a first processing unit positioned adjacent an outer surface of the lower roll for crosslinking the plurality of elastic filaments;
- a second processing unit positioned adjacent an outer surface of the upper roll;
- a supply source for providing at least one nonwoven web; and
- a lamination nip for joining the plurality of elastic filaments to the nonwoven web.

* * * * *